(No Model.)
W. W. SMITH.
METALLIC WHEEL.
No. 392,234. Patented Nov. 6, 1888.
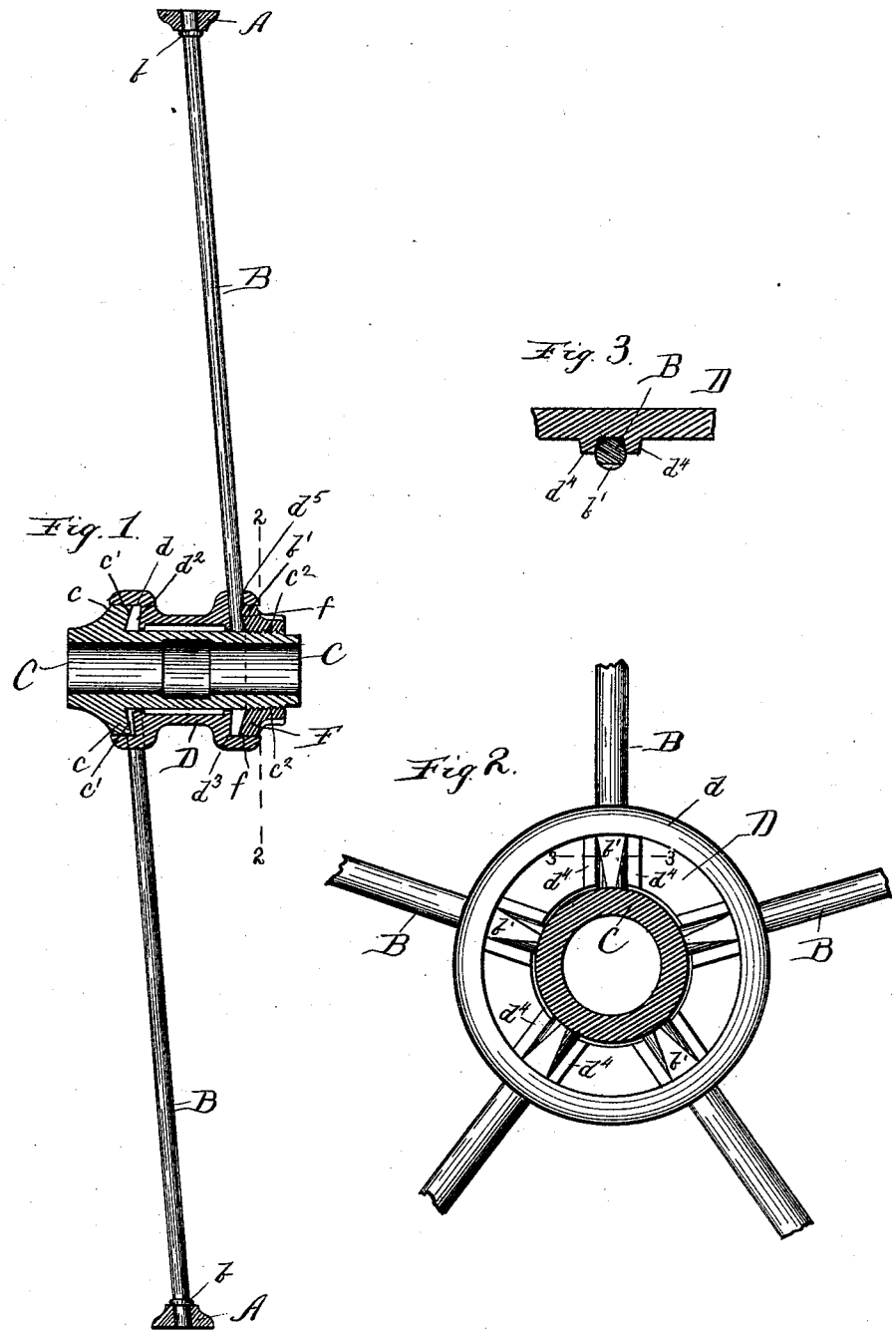

United States Patent Office.

WILLIAM W. SMITH, OF LA PORTE, INDIANA.

METALLIC WHEEL.

SPECIFICATION forming part of Letters Patent No. 392,234, dated November 6, 1888.

Application filed July 25, 1888. Serial No. 280,980. (No model.)

*To all whom it may concern:*

Be it known that I, WILLIAM W. SMITH, a citizen of the United States, residing in La Porte, in the county of La Porte and State of Indiana, have invented a new and useful Improvement in Metallic Wheels, of which the following is a specification.

My invention relates to wheels having metal spokes, hubs, and tires.

The object of my invention is to produce a metal wheel of a strong, simple, and durable construction, and which may be manufactured rapidly and cheaply.

To this end it consists in the novel devices and novel combination of parts and devices herein shown and described, and more particularly pointed out in the claims, whereby I am enabled to firmly and rigidly secure the tire, spokes, and the parts of the hub all securely together without any expensive turning or fitting and without materially cutting or weakening the plain metal rods of which the spokes are formed.

In the accompanying drawings, which form a part of this specification, and in which similar letters of reference indicate like parts, Figure 1 is a radial section of a wheel embodying my invention. Fig. 2 is a section taken on a zigzag line on line 2 2 of Fig. 1, and Fig. 3 is a detail section on line 3 3 of Fig. 2.

In the drawings, A represents the tire; B, the spokes, the outer ends of which are furnished with the usual shoulder, $b$, and inserted through suitable holes in the tire and riveted thereto.

The hub is composed of three parts or castings—viz., the box C, in which the axle fits, the outer shell, D, and the nut F—all of which coact together in securing and supporting the spokes B. The box part C is furnished near one end with a collar or shoulder, $c$, having an inclined inner face, $c'$. The opposite end of the box C is furnished with screw-threads $c^2$ to receive the threaded nut F. The nut F is furnished with an inclined inner face, $f$, similar to the inclined inner face $c'$ of the shoulder $c$. The shell D fits over the box C. The interior diameter of the shell D is enlarged at each end, as shown at $d$, so that the ends $d$ of the shell will fit over or overhang the nut F and the collar $c$ of the box C. By thus enlarging the diameter of the shell at its ends the shell is furnished with two interior shoulders, $d^2$ $d^3$, between which shoulder $d^2$ and the collar $c$ one half of the spokes B are clamped, and between which shoulder $d^3$ and the nut F the remaining half of the spokes are clamped. To provide a better support or socket for the inner ends of the spokes, the interior shoulders, $d^2$ $d^3$, are each furnished with radial ribs or projections $d^4$. These are clearly shown in Fig. 2 and in the section, Fig. 3. Each of the spokes B, at its inner end, is furnished with a dovetail-shaped tenon, $b'$, on one side, corresponding to the inclined face $f$ of the nut F or to the inclined face $c'$ of the collar $c$. The shell D is furnished near each end with holes $d^5$ for the spokes to pass through. The wheel indicated in the drawings is a ten-spoke wheel, five of the spokes being clamped between collar $c$ and shoulder $d^2$ and the remaining five being clamped between the shoulder $d^3$ and nut F.

In constructing the wheel, after the spokes B are first inserted in place in the shell D and tire A and riveted to the tire, the parts thus put together are placed in a suitable drill press or machine and the beveled tenons $b'$ all simultaneously cut on the outer side of one half of the spokes, and then the wheel turned and the beveled tenons $b'$ similarly cut simultaneously on the other half of the spokes. This not only renders it a very simple, easy, and cheap operation to form the dovetail tenons $b'$ in one side of the spokes, but I am thus enabled to secure a perfect and proper fit or bearing between the spokes and the inclined faces of the nut F and collar $c$, so that each spoke is individually held and secured by the common clamping-nut, F, and collar $c$. As the bevel tenons or notches are thus cut only on the outer side of the spokes and all on the same bevel or conical surface and corresponding to the bevel or conical face $c'$ of the collar $c$ or the conical face $f$ of the nut F, it is obvious that each and every spoke will be firmly and equally clamped between the opposing parts of the hub, and that the inclined or conical surfaces $c'$ of the collar $c$ or $f$ of the nut F will fit accurately and snugly against each and every spoke, and thus produce a firm and rigid wheel, and that each and all the spokes will properly coact together to brace and sustain the wheel. After the dovetails $b'$ are thus formed in the outer faces of the spokes B, the box C is inserted through the shell D and the nut F firmly screwed into place, thus firmly clamping each and all of the spokes B between and by the three parts of the hub. The end-thrust of the spokes is in part supported against the collar c and nut F as the shoulder of the dovetail b' in the spokes overhangs such collar and nut, as is clearly shown in the drawings at Fig. 1. The end of the spokes B also abut against the box C. The dovetails b' are formed only on one side or face, and consequently do not materially weaken the spokes. At the same time these dovetails, in connection with the three parts C D F of the hub which clamp the spokes, securely and rigidly hold the spokes against any outward or pulling-out strains.

I hereby disclaim as not of my invention the devices shown and described in the Patents No. 102,853, of May 10, 1870, to Munson, No. 278,438, of May 29, 1883, to Lane, and No. 357,120, of February 1, 1887, to Ewing. In my invention the bevel-tenons consist of inclined faces cut only on the outer side of all the spokes, and for each series or rank of spokes corresponding or parallel to the inclined or conical surface of the parts of the hub which fit against said inclined faces or tenons of the spokes.

I claim—

1. The metal wheel consisting in the combination of tire A with spokes B, furnished with dovetail tenons b', formed by inclines cut on the outer side or face only of said spokes, box C, having an annular collar or shoulder, c, at one end, furnished with inclined face c', and provided with screw-threads at its opposite end, nut F, having inclined face f, and shell D, having its diameter enlarged at each end and provided with internal shoulders, $d^2 d^3$, between which shoulders and said nut and collar said spokes are clamped, said spokes being inserted through suitable holes in said shell D, the incline b' cut in each series or rank of spokes lying all in the same conical or bevel surface, substantially as specified.

2. The combination, with tire A, having a series of spokes, B, riveted thereto, of shell D, having interior shoulders, $d^2 d^3$, of box C, having inclined face, collar c, and nut F, having inclined face, said series of spokes having dovetails b' cut therein after the spokes are riveted to the tire and only on the outer side thereof, corresponding to the inclined faces of said collar C and nut F, whereby each spoke is perfectly clamped and held by said box, shell, and nut, substantially as specified.

3. The combination of the shell D, having interior shoulders, of the box C, having exterior inclined shoulder, nut F, having inclined face, tire A, and spokes B, having holding-tenons formed by inclines cut on their outer faces only, substantially as specified.

4. The combination of the shell D, having interior shoulders, $d^2 d^3$, furnished with radial ribs or projections $d^4$, of the box C, having exterior inclined shoulder, nut F, having inclined face, tire A, and spokes B, having holding-tenons formed by inclines cut on their outer faces only, substantially as specified.

WILLIAM W. SMITH.

Witnesses:
 A. L. OSBORN, Jr.,
 J. R. FRASER.